(12) United States Patent
Charest

(10) Patent No.: US 11,333,285 B2
(45) Date of Patent: May 17, 2022

(54) HOSE COUPLING GUARD

(71) Applicant: Arkema Inc., King of Prussia, PA (US)

(72) Inventor: Sylvain Charest, Trois-Rivieres (CA)

(73) Assignee: Arkema Inc., King of Prussia, PA (US)

( * ) Notice: Subject to any disclaimer, the term of this patent is extended or adjusted under 35 U.S.C. 154(b) by 295 days.

(21) Appl. No.: 16/666,528

(22) Filed: Oct. 29, 2019

(65) Prior Publication Data

US 2021/0123554 A1    Apr. 29, 2021

(51) Int. Cl.
*F16L 55/07* (2006.01)

(52) U.S. Cl.
CPC .......... *F16L 55/07* (2013.01); *F16L 2201/20* (2013.01)

(58) Field of Classification Search
CPC ......... F16L 55/07; F16L 57/005; F16L 57/00; F16L 37/18; F16L 2201/20; F16L 2201/80; Y10T 403/58
USPC .......................................... 70/232, 175–180
See application file for complete search history.

(56) References Cited

U.S. PATENT DOCUMENTS

| 457,724 A | * | 8/1891 | Johnson | F16L 37/252 |
| | | | | 285/88 |
| 1,480,484 A | * | 1/1924 | Wertz | G09F 13/16 |
| | | | | 359/547 |
| 3,591,091 A | * | 7/1971 | Galloway | B05B 15/658 |
| | | | | 239/523 |
| 4,103,712 A | * | 8/1978 | Fletcher | F16L 37/107 |
| | | | | 137/614.06 |
| 4,982,929 A | * | 1/1991 | Spurling | F16L 37/18 |
| | | | | 251/149.9 |
| 2014/0197628 A1 | * | 7/2014 | Giraldi | F16L 35/00 |
| | | | | 285/87 |

FOREIGN PATENT DOCUMENTS

| CA | 2783579 A1 | * | 1/2013 | ............ F16L 37/18 |
| CA | 2851921 A1 | * | 11/2015 | ............ F16L 35/00 |
| CH | 577137 A5 | * | 6/1976 | ............ F16L 37/18 |
| DE | 9105388 U1 | * | 9/1992 | ............ F16L 35/00 |
| FR | 2342457 A1 | * | 9/1977 | ........... H01R 13/447 |

* cited by examiner

*Primary Examiner* — Zachary T Dragicevich
*Assistant Examiner* — James A Linford
(74) *Attorney, Agent, or Firm* — Steven D. Boyd

(57) ABSTRACT

A hose coupling guard including a fixture configured to connect to a hose coupling having a release mechanism, and a cover movably connected to the fixture to be movable between a first position and a second position. The cover includes a shield configured to enclose the release mechanism when the cover is in the first position, and to expose the release mechanism when the cover is in the second position. A display surface may be located on the shield and configured to be oriented to face a location from which an operator can operate the release mechanism.

12 Claims, 3 Drawing Sheets

HOSE COUPLING GUARD

BACKGROUND OF THE INVENTION

A variety of hose couplings are used in commercial and industrial settings to releasably join two hoses together. Such couplings can be in the form of bayonet fittings, threaded fasteners, cam locks (e.g., cam and groove couplings), toggle clamps, sliding decouplers (e.g., a sleeve that moves to release ball bearings from a detent), and so on.

Such hose couplings often carry fluids or gasses under high pressure, in which case the pressure must be dissipated to ensure safe uncoupling of the hoses. Failure to depressurize the hoses could result in injury and lost material. Such risks are increased when the material is also at a high temperature or is a hazardous material, and when the hose end is free to move after being decoupled.

Where there is a risk of decoupling a pressurized hose, safety procedures typically require the operator to vent or otherwise reduce the pressure in the hose before decoupling. However, human error in following such procedures can result in pressurized decoupling events. Thus, there remains a need to advance the state of the art.

This description of the background is provided to assist with an understanding of the following explanations of exemplary embodiments, and is not an admission that any or all of this background information is necessarily prior art.

SUMMARY OF THE INVENTION

In one exemplary aspect, there is provided a hose coupling guard having a fixture configured to connect to a hose coupling having a release mechanism, and a cover movably connected to the fixture to be movable between a first position and a second position. The cover includes a shield configured to enclose the release mechanism when the cover is in the first position, and to expose the release mechanism when the cover is in the second position A display surface may be located on the shield and configured to be oriented to face a location from which an operator can operate the release mechanism.

In some exemplary aspects, the fixture comprises a crossbeam configured to span a side of the hose coupling and a U-bolt configured to surround an opposite side of the hose coupling and be secured to the crossbeam.

In some exemplary aspects, the cover is pivotally connected to the fixture by a hinge.

In some exemplary aspects, the cover further comprises at least one handle. The at least one handle may comprise a first handle extending laterally in a first direction from a longitudinal axis of the hose coupling, and a second handle extending laterally in a second direction from the longitudinal axis of the hose coupling. The release mechanism may comprise a first lever located on a first lateral side of the longitudinal axis of the hose coupling, and a second lever located on a second lateral side of the longitudinal axis of the house coupling, and, when the cover is in the first position, the first handle is located adjacent the first lever, and the second handle is located adjacent the second lever.

In some exemplary aspects, the shield comprises a semi-cylindrical panel.

In some exemplary aspects, the shield comprises a solid enclosure.

In some exemplary aspects, the release mechanism is movable along a travel path from an engaged position to a disengaged position, and at least a portion of the shield is located in the travel path when the cover is in the first position.

In some exemplary aspects, the release mechanism comprises a first lever located on a first lateral side of a longitudinal axis of the hose coupling, and a second lever located on a second lateral side of the longitudinal axis of the hose coupling, and the shield is dimensioned to prevent the first lever and the second lever from moving to a respective disengaged position when the cover is in the first position.

In some exemplary aspects, the display surface is movably mounted to the shield.

In some exemplary aspects, the display surface comprises a flat panel depicting a warning message.

In some exemplary aspects, a travel stop is provided and configured to prevent the cover from moving past the second position. The travel stop may be configured to maintain a center of gravity of the cover on a first side of a movable connection joining the cover to the fixture throughout movement of the cover between the first position and the second position, such that that a gravitational force applied to the center of gravity causes the cover to move to the first position from the second position.

In some exemplary aspects, a return spring is provided which is operatively connected between the cover and the fixture and configured to bias the cover to the first position.

BRIEF DESCRIPTION OF THE DRAWINGS

Embodiments of inventions will now be described, strictly by way of example, with reference to the accompanying drawings, in which.

In the figures, like reference numerals refer to the same or similar elements.

DETAILED DESCRIPTION OF THE DRAWINGS

Figure 1:
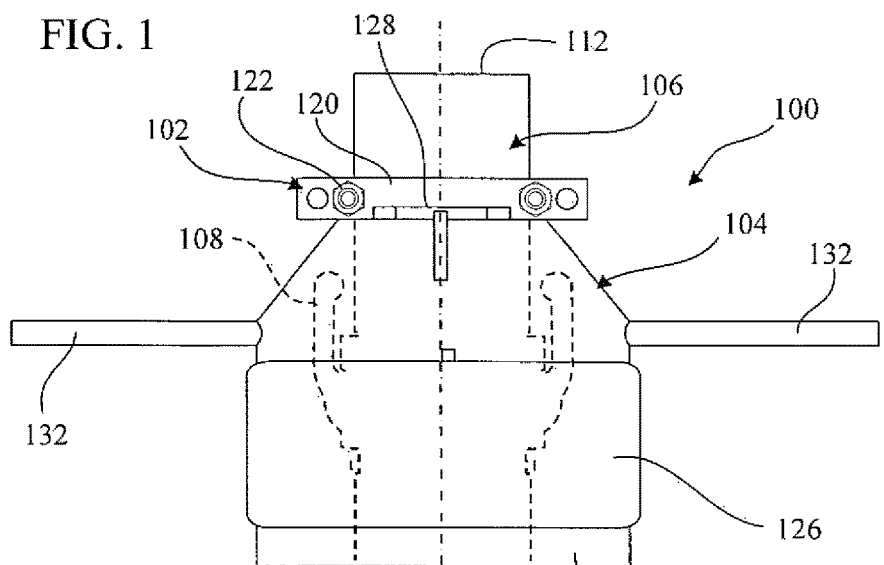
FIG. 1 illustrates a first exemplary embodiment of a hose coupling guard shown in top plan view, with the cover in the first position.

Exemplary embodiments of the present invention provide a hose coupling guard that is configured to help prevent inadvertent release of the hose coupling while in a pressurized state. It will be understood that features of the different embodiments may be used separately or in conjunction with each other, and features from all embodiments may be combined to advantage.

First and second exemplary embodiments of a hose coupling guard 100 is illustrated in FIGS. 1-5. The hose coupling guard 100 generally includes a fixture 102 and a cover 104. The fixture 102 is configured to connect to a hose coupling 106 having a release mechanism 108. The hose coupling 106 includes two hose ends 110, 112 that are secured together by the release mechanism. The hose ends 110, 112 typically are formed with male and female interfaces, which may be threaded or unthreaded, or may include rotary bayonet-fittings or the like.

The release mechanism 108 may comprise any suitable hose connector mechanism. In the shown examples, the release mechanism 108 comprises a so-called "cam and groove" connector, having one lever arm 114 located on each opposite side of the hose coupling 106. The lever arms 114 are each pivotable about a respective pivot pin 116, and each travels along a respective travel path 118 (see, e.g., FIG. 5) to move from the engaged position to the disengaged position. In other cases, the release mechanism may comprise a linear slide (e.g., a collar that slides along the length of the hose coupling 106 to unlock the connection), mating threaded fasteners, threaded fittings, and so on. It will be appreciated that embodiments may be usable with, or tailored to be used with, any variety of release mechanisms.

The fixture 102 may comprise any suitable mechanism for securely mounting to the hose coupling 106. In the shown example, the fixture 102 comprises a crossbeam 120 (e.g., a section of square steel tubing) that is secured to the hose coupling 106 by a U-bolt 122. The crossbeam 120 is dimensioned to span one side of the hose coupling 106, so that the U-bolt 122 can be easily installed into holes passing through the crossbeam 120. If desired, the crossbeam 120 may include multiple different hole patterns to accommodate different size hose couplings 106 and different size U-bolts 122. This arrangement is expected to be a simple and effective configuration for attaching to a variety of hose coupling structures, but other configurations may be used. For example, the fixture 102 may comprise a plate that is bolted or welded directly to the hose coupling 106. As another example, the fixture 102 may be indirectly mounted to the hose coupling 106 by attaching it to a structure that surrounds or is adjacent to the hose coupling 106.

Figure 2:
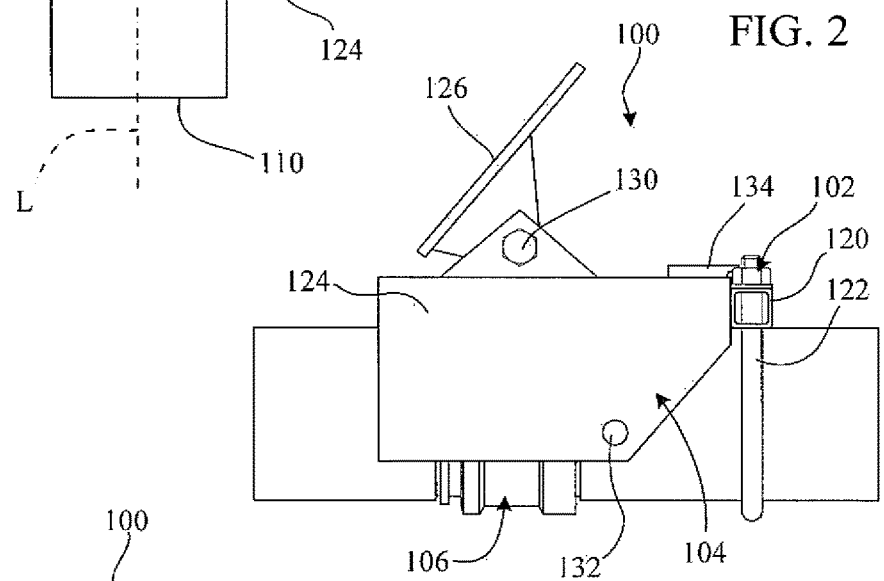
FIG. 2 illustrates the hose coupling guard of FIG. 1 in side elevation view, with the cover in the first position.
Figure 4:
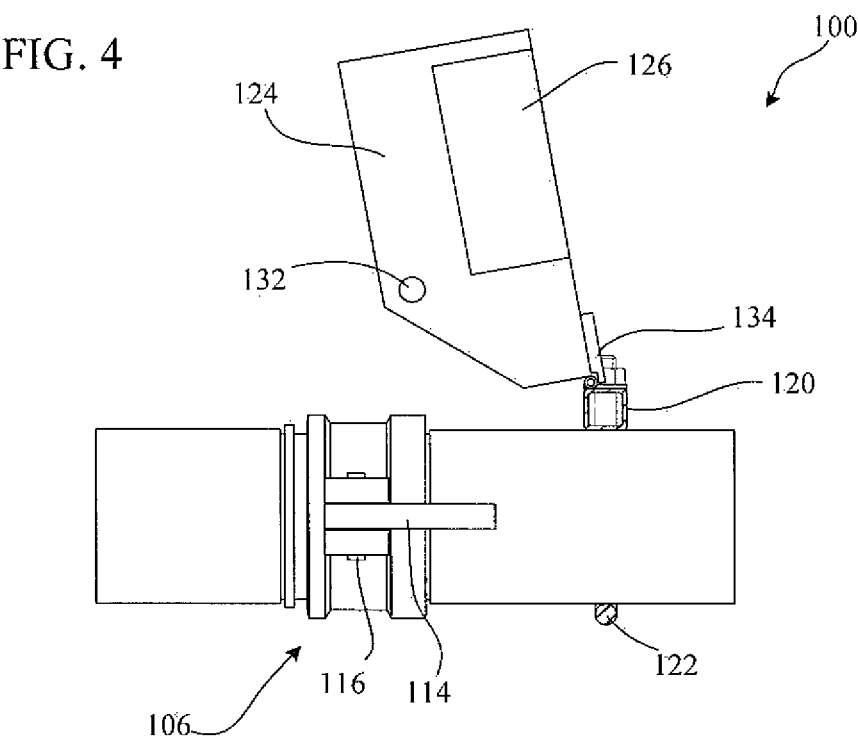
FIG. 4 illustrates a second exemplary embodiment of a hose coupling guard in side elevation view, with the cover in the second position.

The cover 104 includes a shield 124 and also may include a display surface 126. The shield 124 is movably connected to the fixture 102 by a movable joint, such as a hinge 128 or linkage. The hinge 128 in this example is a simple pivot hinge, which allows the cover 104 to move, relative to the fixture 102, between a first position such as shown in FIG. 2 and a second position such as shown in FIG. 4. When the cover 104 is in the first position, the shield 124 is configured to enclose the release mechanism 108 to prevent operation of the release mechanism 108. When the cover 104 is in the second position, the shield 124 is positioned to expose and allow access to the release mechanism 108. In other cases, the pivoting hinge 128 may be replaced by a sliding mechanism, a four-bar linkage, or other mechanisms that allow the cover 104 to move relative to the fixture 102.

Figure 3:
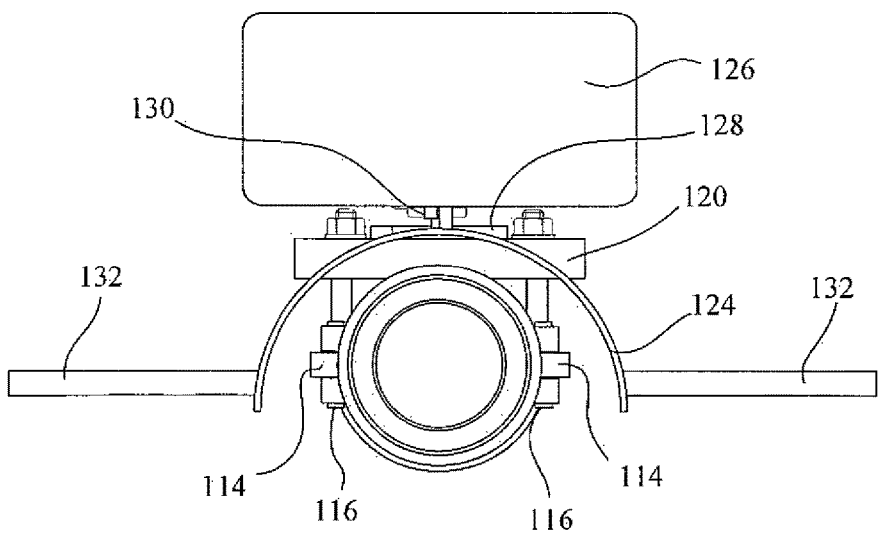
FIG. 3 illustrates the hose coupling guard of FIG. 1 in front elevation view, with the cover in the first position.
Figure 5:
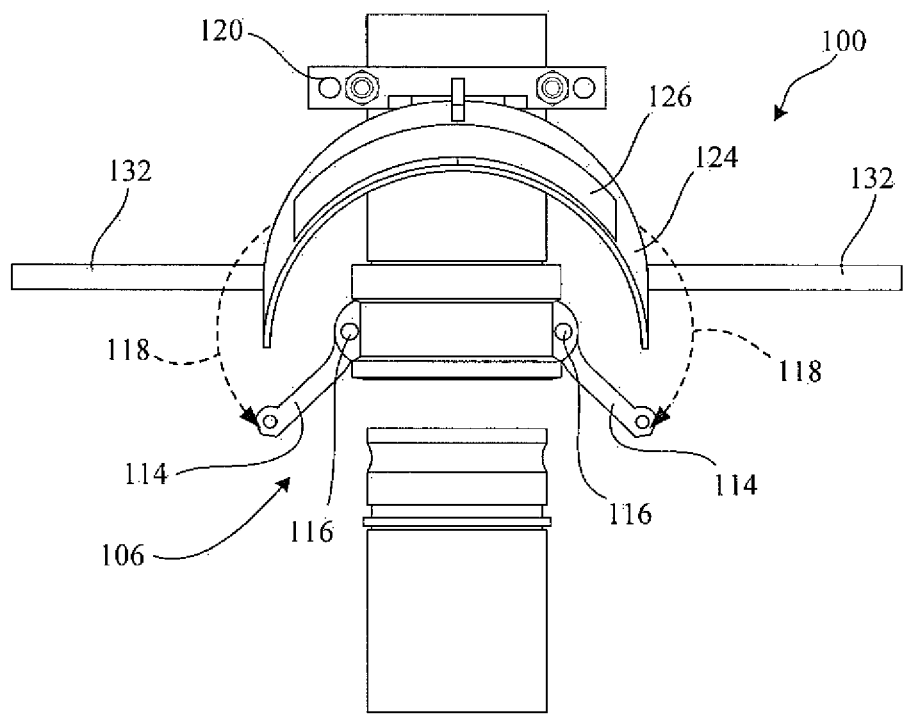
FIG. 5 illustrates the hose coupling guard of FIG. 4 in top plan view, with the cover in the second position and the hose coupling disconnected.

In the embodiment of FIGS. 1-3, the display surface 126 extends from the shield 124, and is configured such that it faces a location from which an operator can operate the release mechanism 108. The display surface 126 may be rigidly mounted to the shield 124 (e.g., by welding or being integrally formed with the shield), or it may be movable relative to the shield 124. In this case, the display surface 126 is mounted to the shield 124 by a bolt 130, which can be loosened to change the orientation of the display surface 126 relative to the shield 124, and tightened to lock the display surface 126 in the desired orientation. In the embodiment of FIGS. 4-5, the display surface 126 is flush with the shield 124, and may comprise a painted surface of the shield 124, a sticker attached to the shield 124, embossed or etched lettering or images on the shield surface 124, and so on. Other alternatives and variations will be apparent to persons of ordinary skill in the art in view of the present disclosure.

The display surface 126 is provided with a message that instructs the operator of the hose coupling 106 about pressurized contents of the hose coupling 106. The message may be a graphical image, text, or a combination of the same. For example, the message may comprise a symbol that represents pressurized fluid, or represents an implication of opening a pressurized hose coupling (e.g., a graphic representing spraying material or a moving hose). The message also may identify the contents of the hose coupling, either graphically (e.g., a hazardous chemical symbol) or by text. In a preferred embodiment, the message provides a reminder or an instruction to remove pressure from the hose coupling 106 before operating the release mechanism 108. The display surface 126 also may include colors suggestive of a safety warning (typically red or another bright color), and may include illuminated features. For example, the display surface 126 may comprise a red background with white text stating "Attention, open drain valve before breaking hose connection" or a similar message. The display surface 126 may be flat, as shown, or it may have a curved face or multiple faces oriented in different directions to provide more universal visibility.

The cover 104 also may include features to assist the operator with moving the cover 104 to the second position. For example, the cover 104 may include one or more handles 132. In this case, there are two handles 132. One handle 132 extends from the shield 124 laterally in a first direction from the longitudinal axis L of the hose coupling 106, and the other handle 132 extends in the opposite lateral direction from the longitudinal axis L. This configuration allows the operator to move the cover 104 from either side using one hand.

The handles 132 also may be positioned to facilitate operation of the release mechanism 108 once the shield 124 is moved to the second position. For example, each handle 132 may be adjacent to a respective one of the lever arms 114 when the cover 104 is in the first position. Thus, the operator can conveniently push on the two handles 132 with the backs of the hands to move the cover to the second position, then pivot the hands inward to grasp the lever arms 114 with the fingers, all without making large arm movements that might be difficult in confined spaces.

In some cases, it also might be desirable to try to ensure that the operator uses both handles 132 to open the cover 104. In this case, the hinge 128 may be formed with a connection that inhibits opening unless the handles 132 are operated in unison. Such a connection may be a provided by using a double-shear hinge with the inner walls of the outer members closely adjacent the outer walls of the inner member, but with an undersized pivot pin. Thus, when only one handle 132 is lifted, the undersized pin allows the cover to rotate about an axis perpendicular to the hinge axis, causing the facing walls to bind together to inhibit opening. Other alternatives and variations will be apparent to persons of ordinary skill in the art in view of the present disclosure.

The shield 124 may have any suitable shape to inhibit or prevent the operator from unlocking the release mechanism 108. For example, as shown in FIGS. 1-5, the shield 124 may be formed as a semi-cylindrical panel that wraps partially around the hose coupling 106 to prevent the operator from reaching the lever arms 114. The shield 124 comprises a solid enclosure that is not perforated by holes or screens. This provides an order of protection to prevent inadvertent access to the release mechanism 108, and may help deflect dispersal of the hose coupling contents if the pressure is not properly or fully released prior to uncoupling. However, in some cases, the shield 124 may comprise a non-solid enclosure, such as perforated panel or mesh screen, which allows the operator viewing access to the hose coupling 106 to assist with periodic status checks or the like.

The shield 124 as thus described inhibits access to the release mechanism 108. The shield 124 also may be configured to affirmatively interfere with operation of the release mechanism 108. For example, the shield 124 may be shaped and dimensioned to be located within the travel path of the release mechanism 108, such that the release mechanism 109 cannot be moved far enough to partially or fully release the hose coupling 106. Such a configuration is illustrated in the embodiment of FIGS. 1-5, in which the inner surface of the shield 124 is positioned within the travel path 118 of the lever arms 114 when the cover 104 is in the first position, but is not within the travel path 118 when the cover 104 is in the second position.

If desired, a similar shield or other enclosure body (not shown) may be fixed in place on the other side of the hose coupling to cooperate with the shield 124 to more fully enclose the release mechanism 108 when the cover 104 is in the first position. This might be helpful if the hose coupling 106 is accessible from different directions, or if it is not feasible or inconvenient for the shield 124 to be configured to intersect the travel path of the release mechanism 108 (e.g., when the release mechanism is a threaded fitting).

The hose coupling guard 100 also may include features to control the motion of the cover 124. For example, the embodiment of FIGS. 1-5 includes a travel stop 134 located on the cover 104. The travel stop 134 is configured to prevent the cover 104 from moving past the second position by contacting an adjacent surface of the crossbeam 120. If desired, the travel stop 134 may be adjustable, such as by forming it as a screw that can be threaded into and out of a hole to change its position.

The travel stop 134 also may be configured to help ensure that the cover 124 rests in the first position when access to the hose coupling 106 is not required. For example, the travel stop 134 may be configured such that the center of gravity C of the cover 104 is maintained on a first side of the hinge 128 or other movable connection joining the cover 104 to the fixture 102. Thus, gravity acts on the center of gravity C to bias the cover 104 to the first position, regardless of whether the cover 104 is at the first position, the second position, or somewhere in between.

The hose coupling guard 100 also may include features such as holes to receive locks to prevent unauthorized access (e.g., so-called "lockout tags" or the like), clasps to hold the cover 104 in one or both of the first position and the second position, and so on. Other alternatives and variations will be apparent to persons of ordinary skill in the art in view of the present disclosure.

Figure 6:
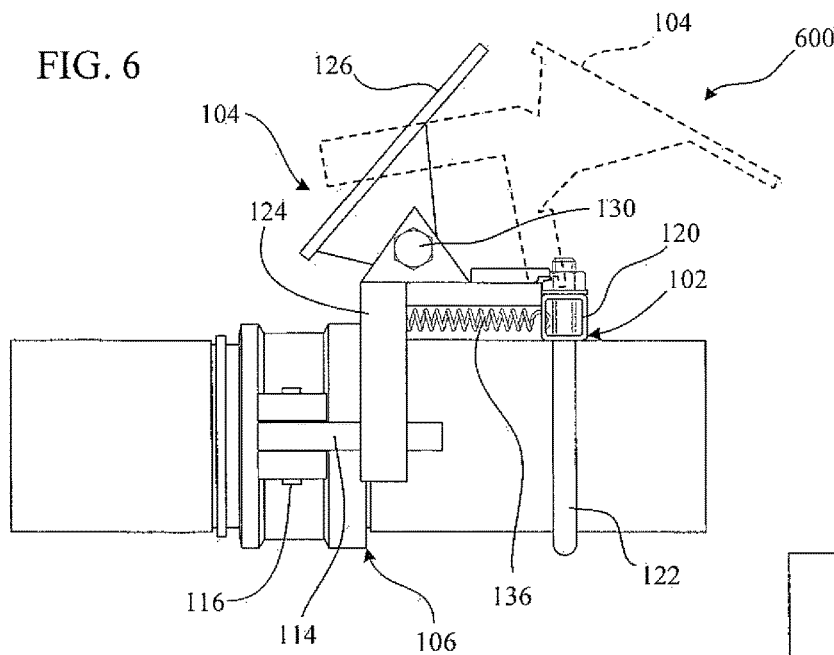
FIG. 6 illustrates a third exemplary embodiment of a hose coupling guard shown in side elevation view, with the cover in the first position in solid lines, and in the second position in broken lines.
Figure 7:
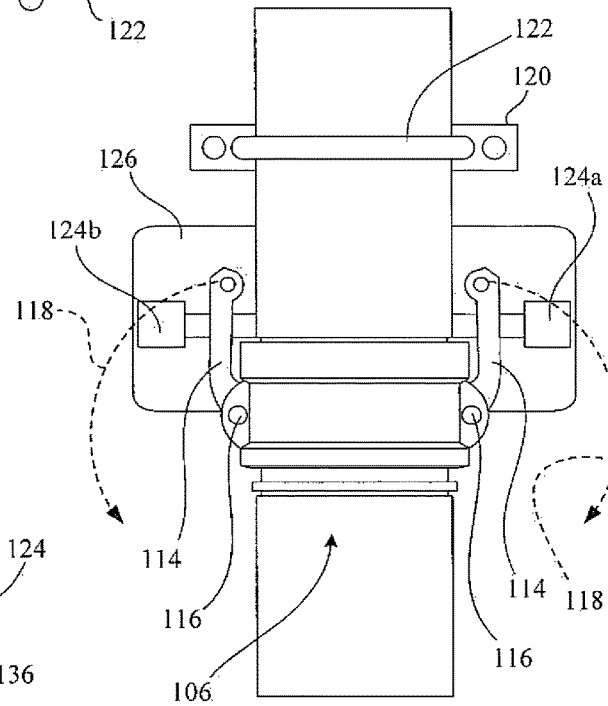
FIG. 7 illustrates the hose coupling guard of FIG. 6 in bottom plan view, with the cover in the first position.
Figure 8:
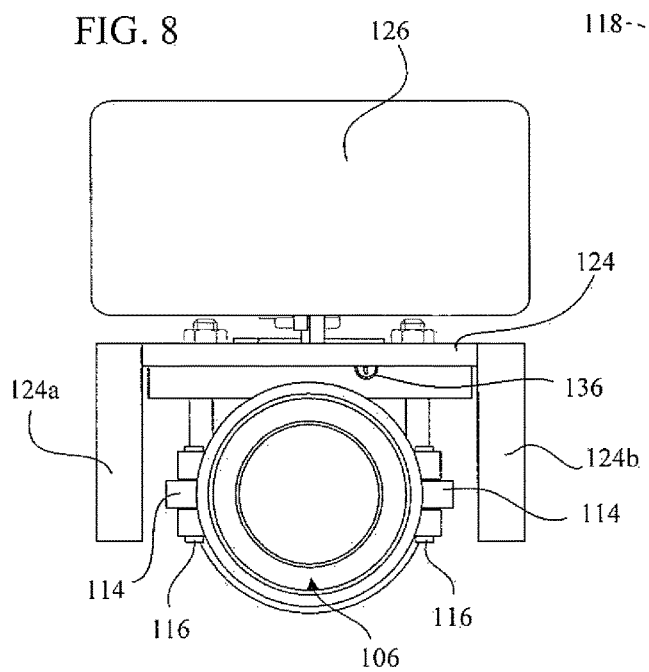
FIG. 8 illustrates the hose coupling guard of FIG. 1 in front elevation view, with the cover in the first position.

FIGS. 6-8 illustrate another exemplary embodiment of a hose coupling guard 600. In this case, the hose coupling guard 600 includes a fixture 102 and a cover 104 movably mounted to the fixture 102. The cover 104 includes a shield 124 and a display surface 126. This embodiment differs from the previous embodiment in several ways. First, the shield 124 is not formed as a solid enclosure, but instead comprises two extensions 124a, 124b that are positioned, when the cover 104 is in the first position, in the travel path 118 of the release mechanism 108 (see FIG. 7). Thus, the hose coupling 106 is generally accessible for inspection, cleaning and the like, but the hose coupling 106 cannot be released until the cover 104 is moved to the second position, as shown in dotted lines in FIG. 6. In this case, a transparent cover may be provided on the shield to protect the operator from potential contact with escaping fluids.

FIGS. 6-8 also include a return spring 136 is operatively connected between the cover 104 and the fixture 102, and configured to bias the cover 104 to the first position by exerting a resilient restoring force on the cover 104. The return spring 136 is shown as a coil spring operating in tension, but other springs may be used. For example, the return spring 136 may be integrated into the hinge 128 as a torsion spring, or it may comprise a flexible elastic band or some other resilient structure. It will be understood that a return spring can be used in other embodiments, such as the embodiments of FIGS. 1-5.

It will also be understood that hose coupling guards according to this disclosure can be used in various different orientations. For example, the hose coupling guard may be oriented horizontally, vertically, or at any angle. In some orientations, it may be desirable to include a return spring, such as discussed above, to hold the guard in the covering position. It also may be desirable to add balance springs to help the user lift a hose coupling guard if it is particularly heavy. In still other cases, the return spring may be double-acting to hold the cover in both the covering and the non-covering positions. Other alternatives and variations will be apparent to persons of ordinary skill in the art in view of the present disclosure.

Aspects of the Invention:

As will be appreciated from the foregoing description, the present invention is embodied in, and can take the form of various different aspects. For example:

In a first aspect, the invention provides a hose coupling guard comprising: a fixture configured to connect to a hose coupling having a release mechanism; and a cover movably connected to the fixture to be movable between a first position and a second position. The cover comprises: a shield configured to enclose the release mechanism when the cover is in the first position, and to expose the release mechanism when the cover is in the second position.

In a second aspect, the first aspect may be provided with a display surface on the shield and configured to be oriented to face a location from which an operator can operate the release mechanism.

In a third aspect, the first or second aspect may be provided with the fixture comprising a crossbeam configured to span a side of the hose coupling and a U-bolt configured to surround an opposite side of the hose coupling and be secured to the crossbeam.

In a fourth aspect, the first, second or third aspect may be provided with the cover being pivotally connected to the fixture by a hinge.

In a fifth aspect, any of the first through fourth aspects may be provided with the cover having at least one handle.

In a sixth aspect, the fifth aspect may be provided with the at least one handle including a first handle extending laterally in a first direction from a longitudinal axis of the hose coupling, and a second handle extending laterally in a second direction from the longitudinal axis of the hose coupling.

In a seventh aspect, the sixth aspect may be provided with the release mechanism including a first lever located on a first lateral side of the longitudinal axis of the hose coupling, and a second lever located on a second lateral side of the longitudinal axis of the house coupling, and, when the cover is in the first position, the first handle is located adjacent the first lever, and the second handle is located adjacent the second lever.

In an eighth aspect, any of the first through seventh aspects may be provided with the shield being a semi-cylindrical panel.

In an ninth aspect, any of the first through eighth aspects may be provided with the shield being a solid enclosure.

In a tenth aspect, any of the first through ninth aspects may be provided with the release mechanism being movable along a travel path from an engaged position to a disengaged position, and at least a portion of the shield being located in the travel path when the cover is in the first position.

In an eleventh aspect, any of the first through tenth aspects may be provided with the release mechanism comprising a first lever located on a first lateral side of a longitudinal axis of the hose coupling, and a second lever located on a second lateral side of the longitudinal axis of the hose coupling, and the shield being dimensioned to prevent the first lever and the second lever from moving to a respective disengaged position when the cover is in the first position.

In an twelfth aspect, any of the second through tenth aspects may be provided with the display surface being movably mounted to the shield.

In a thirteenth aspect, any of the second through twelfth aspects may be provided with the display surface being a flat panel depicting a warning message.

In a fourteenth aspect, any of the first through thirteenth aspects may be provided with a travel stop configured to prevent the cover from moving past the second position.

In a fifteenth aspect, the fourteenth aspect may be provided with the travel stop being configured to maintain a center of gravity of the cover on a first side of a movable connection joining the cover to the fixture throughout movement of the cover between the first position and the second position, such that that a gravitational force applied to the center of gravity causes the cover to move to the first position from the second position.

In a sixteenth aspect, any of the first through fifteenth aspects may be provided with a return spring operatively connected between the cover and the fixture and configured to bias the cover to the first position.

The present disclosure describes a number of inventive features and/or combinations of features that may be used alone or in combination with each other or in combination with other technologies. The embodiments described herein are all exemplary, and are not intended to limit the scope of the claims. It will also be appreciated that the inventions described herein can be modified and adapted in various ways, and all such modifications and adaptations are intended to be included in the scope of this disclosure and the appended claims.

The invention claimed is:

1. A hose coupling guard comprising: a fixture configured to connect to a hose coupling having a release mechanism; and a cover movably connected to the fixture to be movable between a first position and a second position, the cover comprising a shield configured to enclose the release mechanism when the cover is in the first position, and to expose the release mechanism when the cover is in the second position, a travel stop to prevent said cover from moving past the second position, said travel stop maintaining a center of gravity of said cover on a first side of a movable connection joining said cover to the fixture throughout movement of said cover between the first position and the second position such that gravitational force applied to the center of gravity of said cover causes said cover to move to the first position from the second position, wherein the fixture comprises a crossbeam configured to span a side of the hose coupling and a U-bolt configured to surround an opposite side of the hose coupling and be secured to the crossbeam, and wherein a return spring operatively connected between the cover and the fixture and configured to bias the cover to the first position.

2. The hose coupling guard of claim 1, where in the cover further comprises a display surface on the shield and configured to be oriented to face a location from which an operator can operate the release mechanism.

3. The hose coupling guard of claim 2, wherein the display surface is movably mounted to the shield.

4. The hose coupling guard of claim 2, wherein the display surface comprises a flat panel depicting a warning message.

5. The hose coupling guard of claim 1, wherein the cover is pivotally connected to the fixture by a hinge.

6. The hose coupling guard of claim 1, wherein the cover further comprises at least one handle.

7. The hose coupling guard of claim 6 wherein the at least one handle comprises a first handle extending laterally in a first direction from a longitudinal axis of the hose coupling, and a second handle extending laterally in a second direction from the longitudinal axis of the hose coupling.

8. The hose coupling guard of claim 7, wherein the release mechanism comprises a first lever located on a first lateral side of the longitudinal axis of the hose coupling, and a second lever located on a second lateral side of the longitudinal axis of the house coupling, and, when the cover is in the first position, the first handle is located adjacent the first lever, and the second handle is located adjacent the second lever.

9. The hose coupling guard of claim 1, wherein the shield comprises a semi-cylindrical panel.

10. The hose coupling guard of claim 1, wherein the shield comprises a solid enclosure.

11. The hose coupling guard of claim 1, wherein the release mechanism is movable along a travel path from an engaged position to a disengaged position, and at least a portion of the shield is located in the travel path when the cover is in the first position.

12. The hose coupling guard of claim 1, wherein the release mechanism comprises a first lever located on a first lateral side of a longitudinal axis of the hose coupling, and a second lever located on a second lateral side of the longitudinal axis of the hose coupling, and the shield is dimensioned to prevent the first lever and the second lever from moving to a respective disengaged position when the cover is in the first position.

* * * * *